United States Patent
Jackson

(10) Patent No.: US 11,248,939 B2
(45) Date of Patent: Feb. 15, 2022

(54) METHODS, SYSTEMS, AND COMPUTER READABLE MEDIA FOR CALIBRATION TESTING AND TRACEABILITY USING A DISTRIBUTED LEDGER

(71) Applicant: Keysight Technologies, Inc., Santa Rosa, CA (US)

(72) Inventor: Stephen Samuel Jackson, Chapel Hill, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 649 days.

(21) Appl. No.: 16/129,295

(22) Filed: Sep. 12, 2018

(65) Prior Publication Data

US 2020/0080873 A1    Mar. 12, 2020

(51) Int. Cl.
*G01D 18/00* (2006.01)
*G06F 16/22* (2019.01)

(52) U.S. Cl.
CPC ......... *G01D 18/00* (2013.01); *G06F 16/2255* (2019.01)

(58) Field of Classification Search
CPC ............................ G06F 16/2255; G06Q 10/20
See application file for complete search history.

(56) References Cited

U.S. PATENT DOCUMENTS

| | | | |
|---|---|---|---|
| 5,918,191 A | 6/1999 | Patel | |
| 6,356,780 B1 | 3/2002 | Licato et al. | |
| 7,406,388 B2 | 7/2008 | Casto et al. | |
| 10,797,873 B2 | 10/2020 | Reading et al. | |
| 2018/0219676 A1* | 8/2018 | Mattingly | H04L 63/08 |
| 2019/0020480 A1 | 1/2019 | Camenisch et al. | |
| 2019/0349204 A1 | 11/2019 | Enke et al. | |
| 2020/0036729 A1* | 1/2020 | Maneval | G05B 19/0421 |
| 2020/0084026 A1 | 3/2020 | Reading et al. | |

OTHER PUBLICATIONS

Notice of Allowance and Fee(s) Due for U.S. Appl. No. 16/129,229 (dated Jul. 14, 2020).
Commonly-Assigned, co-pending U.S. Appl. No. 16/129,229 for "Methods, Systems, and Computer Readable Media for Verifying Calibration Information Using a Distributed Ledger," (Unpublished, filed Sep. 12, 2018).
Orcutt, "Meet the blockchain for building better widgets, cheaper and faster," pp. 1-6 (May 3, 2018).
"Symmetric vs. Asymmetric Encryption—What are differences?," SSL2BUY, https://www.ssl2buy.com/wiki/symmetric-vs-asymmetric-encryption-what-are-differences, pp. 1-7 (Copyright 2010-2017).

* cited by examiner

*Primary Examiner* — Roy Y Yi
*Assistant Examiner* — Geoffrey T Evans

(57) ABSTRACT

A method that occurs at a calibration system includes generating a first digital record based on a calibration of the calibration system using a calibration source; providing a copy of the first digital record to a first device under test (DUT); and providing a calibration test signal associated with a calibration of the first DUT, wherein the first DUT uses the first digital record in generating a second digital record based on the calibration of the first DUT.

18 Claims, 8 Drawing Sheets

METHODS, SYSTEMS, AND COMPUTER READABLE MEDIA FOR CALIBRATION TESTING AND TRACEABILITY USING A DISTRIBUTED LEDGER

TECHNICAL FIELD

The subject matter described herein relates to distributed ledger applications. More specifically, the subject matter relates to methods, systems, and computer readable media for calibration testing and traceability using a distributed ledger.

BACKGROUND

Manufacturers generally test and calibrate equipment for various purposes, e.g., government compliance and quality assurance. For example, a manufacturer may utilize calibration devices or labs to test that one or more pieces of equipment are performing as expected and meet particular accuracy, with traceability to National Metrology Institute (NMI) standards. In this example, the one or more pieces of equipment may also be calibrated or adjusted to improve performance or meet standards. After calibration is performed, calibration information (e.g., certificates, devices involved in the calibration, calibration settings, calibration operator details, location of calibration, traceability documents, and/or other related details) may be generated and stored for future audits or inspections by the manufacturer and/or other parties. As the amount of calibration information grows, the calibration information may become increasing difficult to store in a scalable and orderly manner. Further, the retrieval of the calibration information may require humans to identify, approve, and provide various documents, which can be time consuming and labor intensive. Furthermore, authenticity of the calibration information can be difficult to validate, e.g., since documents may be forgeable and/or may lack proof of authenticity, e.g., from a trusted source.

Accordingly, a need exists for methods, systems, and computer readable media for calibration testing and traceability using a distributed ledger.

SUMMARY

Methods, systems, and computer readable media for calibration testing and traceability using a distributed ledger are disclosed. One method occurs at a calibration system implemented using at least one processor. The method includes generating a first digital record based on a calibration of the calibration system using a calibration source; providing a copy of the first digital record to a first device under test (DUT); and providing a calibration test signal associated with a calibration of the first DUT, wherein the first DUT uses the first digital record in generating a second digital record based on the calibration of the first DUT.

A system includes a distributed ledger system implemented using at least one processor. The distributed ledger system is configured for: generating a first digital record based on a calibration of the calibration system using a calibration source; providing a copy of the first digital record to a first device under test (DUT); and providing a calibration test signal associated with a calibration of the first DUT, wherein the first DUT uses the first digital record in generating a second digital record based on the calibration of the first DUT.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to at least one physical computing platform including one or more processors, network interfaces, and memory.

As used herein, each of the terms 'engine' and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

Figure 1:
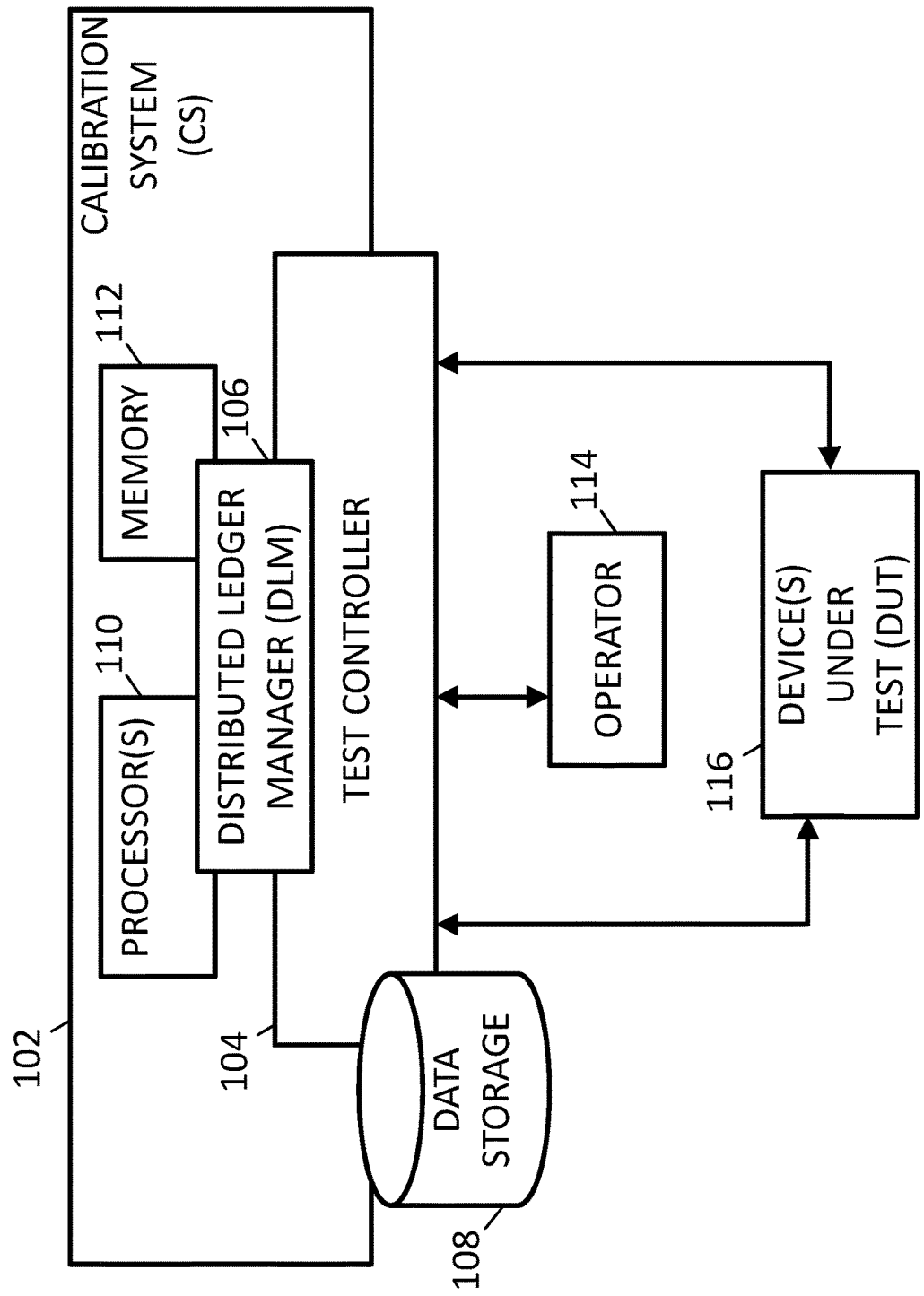
FIG. 1 is a diagram illustrating an example computing environment for a distributed ledger enabled calibration system.

The subject matter described herein relates to methods, systems, and computer readable media for calibration testing and traceability using a distributed ledger. When calibrating physical or virtual computing equipment or components thereof, it may be desirable to store calibration information (e.g., certifications, reports, calibration results, details about the calibration, etc.) in a secure format. For example, a party, e.g., an auditor or a manufacturer, may want to verify and check traceability of calibration information for equipment or components therein. In this example, if calibration information is stored in various formats (e.g., paper documents and digital files) and/or in multiple filing systems, the retrieval of the calibration information can be time consuming and resource intensive, especially if a human is required. Further, the authenticity and accuracy of the calibration information can be difficult to validate, especially if the calibration information is stored in physical files (e.g., paper documents) or insecure digital files.

In accordance with some aspects of the subject matter described herein, techniques, methods, systems, and/or mechanisms may use one or more distributed ledgers (e.g., blockchains or Merkle tree data structures) to store one or more digital records (e.g., digital certificates and/or hash values) associated with calibration information or related data. For example, a distributed ledger in accordance with some aspects described herein may include blocks or portions containing digital records associated with calibration information for a unit (e.g., a calibrated device, a system of multiple devices, or a calibration system). In this example, a calibration system may generate a first digital record when the calibration system is calibrated using a calibration source and a device under test that is calibrated using the calibration system may generate a second digital record that is based at least in part on the first digital record. Continuing with this example, since digital records may be based on related digital records, since blocks of the distributed ledger may be cryptographically linked (e.g., modifications of a block would require modifications to subsequent blocks), and since the calibration information may be encrypted in an external data store, the data integrity of the calibration information is assured, and the calibration information is secure from unauthorized changes.

In accordance with some aspects of the subject matter described herein, techniques, methods, systems, and/or mechanisms may generate and store system-level digital records (e.g., digital certificates and/or hash values) associated with calibration of multiple components or elements of a system. For example, in an autonomous vehicle, a sensor controller may receive digital certificates containing calibration information for various sensors in the autonomous vehicle. In this example, the sensor controller may generate a system-level digital certificate (e.g., a hash value generated using a SHA-3 function) based on at least the digital certificates associated with the various devices in the autonomous vehicle. In some embodiments, the system-level digital certificate may be stored in a distributed ledger and/or one or more data stores (e.g., databases or data storage systems).

Reference will now be made in detail to example embodiments of the subject matter described herein, examples of which are illustrated in the accompanying drawings. Wherever possible, the same reference numbers will be used throughout the drawings to refer to the same or like parts.

FIG. 1 is a diagram illustrating an example computing environment 100 for a distributed ledger enabled calibration system. Referring to FIG. 1, computing environment 100 may include CS 102 and one or more device(s) and/or system(s) under test (DUT) 116. CS 102 may represent any suitable entity or entities (e.g., one or more computing platforms, nodes, or devices) associated with testing or calibrating DUT 116 (e.g., manufacturing equipment). For example, CS 102 may generate and send traffic to DUT 116 and/or receive traffic from DUT 116 and may analyze one or more aspects associated with DUT 116.

In some embodiments, CS 102 may include a stand-alone tool, a testing device, or software executing on one or more processor(s). In some embodiments, CS 102 may be a single device or node or may be distributed across multiple devices or nodes. In some embodiments, CS 102 may include one or more modules for performing various test related functions. For example, CS 102 may include a signal generator for generating test waveforms, sending the test waveforms to DUT 116, receiving waveforms from DUT 116, and analyzing performance and functionality of DUT 116.

DUT 116 may be any suitable entity or entities (e.g., devices, systems, or platforms) for receiving, processing, forwarding, and/or sending one or more messages. In some embodiments, DUT 116 may include network equipment, industrial equipment, or one or more devices that are being tested and/or calibrated, e.g., to a national standard, by CS 102. For example, DUT 116 may include a security device (e.g., firewall or an intrusion protection system (IPS)) that inspects traffic that traverses the security device (e.g., Internet protocol (IP) packets and/or network communications). In this example, a compliance or certification test may be performed to determine whether DUT 116 meets a related compliance or certification standard.

CS 102 may include a test controller (TC) 104, a distributed ledger manager (DLM) 106, data storage 108, one or more processors 110, and memory 112. TC 104 may be any suitable entity or entities (e.g., software executing on a processor, a field-programmable gateway array (FPGA), and/or an application-specific integrated circuit (ASIC), or a combination of software, an FPGA, and/or an ASIC) for performing one or more aspects associated with testing or calibrating DUT 116 and/or various aspects thereof.

In some embodiments, TC 104 may be implemented using one or more processors 110 and/or memory 112. For example, TC 104 may utilize one or more processors 110 (e.g., executing software stored in memory 112) to generate test packets for a number of calibration routines or tests (e.g., flows or sessions). In another example, TC 104 may also utilize one or more of processors 110 to perform or initiate analyses involving test waveforms and/or related responses from DUT 116.

In some embodiments, TC 104 may include or provide at least one communications interface for communicating with an operator 114 (e.g., a management system or a human operator). For example, operator 114 may be any entity (e.g., an automated system or a device or system controlled or controllable by a human user) for selecting and/or configuring various aspects associated with calibrating and/or generating or configuring calibration settings. In some embodiments, various user interfaces, e.g., an application programming interface (API) and a graphical user interface (GUI), may be available so that operator 114 can provide CS 102 or TC 104 with configuration information (e.g., tests to be performed, types of metrics or statistics to be generated and/or measured, and/or other settings) and/or for controlling (e.g., pause, restart, or stop) a test or calibration session.

DLM 106 may be any suitable entity or entities (e.g., software executing on a processor, an ASIC, an FPGA, or a combination of software, an ASIC, and/or an FPGA) for performing one or more actions associated with storing, accessing, and managing information in one or more distributed ledgers or related data stores (e.g., data storage 108). For example, DLM 106 may receive calibration information or other related data may generate digital signatures (e.g., integrity hash values) based on the calibration information. In this example, DLM 106 may, e.g., using a blockchain client, add or store the calibration information and/or related digital signatures in a distributed ledger.

In some embodiments, DLM 106 may communicate with CS 102 and/or other related entities (e.g., TC 104) to receive, process, or send calibration information and/or related data, e.g., an access security key to allow an entity to access and/or decrypt calibration information. For example, DLM 106 may receive calibration information or other related data from CS 102 or TC 104, may generate a hash value for calibration information, may store the hash value in a blockchain for verifying the calibration information (e.g., when the calibration information is obtained from a data store at a later date by a third party), may also encrypt the calibration information using one or more encryption keys and store the calibration information in one or more data stores, e.g., data storage 108. In this example, DLM 106 may also receive information requests from various entities and may provide access security keys and/or decrypted calibration information.

In some embodiments, TC 104 and/or DLM 106 may include functionality for accessing data storage 108 or other memory. Data storage 108 may be any suitable entity or entities (e.g., a storage device, memory, a non-transitory computer readable medium, or a storage system) for maintaining or storing information related to testing and/or calibration. In some embodiments, data storage 108 and/or memory may be located at CS 102, another node, or distributed across multiple platforms or devices.

In some embodiments, data storage 108 may include one or more data stores for storing different types of calibration information. For example, some unencrypted data may be stored in a first data store, and other encrypted data may be stored in one or more data stores separate from the first data store.

In some embodiments, data storage 108 may contain calibration information, also referred to herein as traceability information, usable for auditing or verifying traceability of a calibrated device. Example calibration information related to a calibration event or related device may include certification information, calibration settings, calibration results, devices involved in the calibration, measurement reports, parties involved with the calibration, calibration location, and/or other details associated with the calibration.

In some embodiments, CS 102, DLM 106, and/or another entity may generate a first digital record (e.g., a hash-based digital certificate) based on a calibration of CS 102 using a calibration source; may provide a copy of the first digital record to a DUT 116; and may provide a calibration test signal associated with a calibration of DUT 116, where DUT 116 uses the first digital record in generating a second digital record based on the calibration of DUT 116.

It will be appreciated that FIG. 1 is for illustrative purposes and that various depicted entities, their locations, and/or their functions described above in relation to FIG. 1 may be changed, altered, added, or removed.

Figure 2:
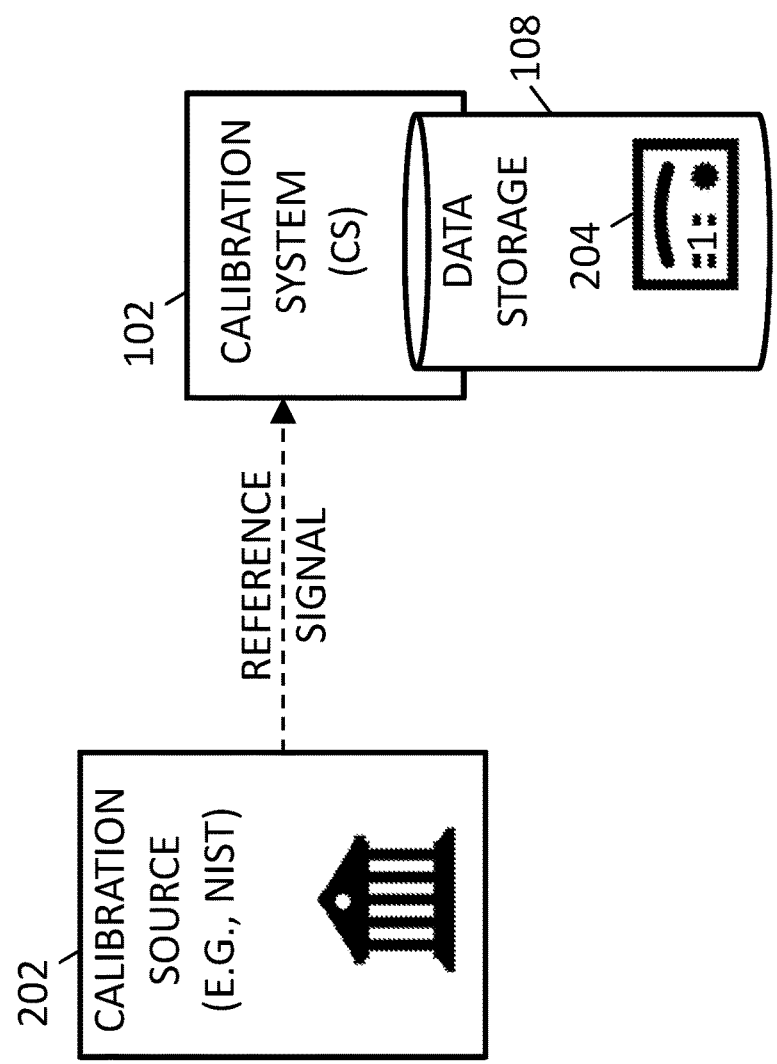
FIG. 2 is a diagram illustrating calibration of the calibration system using a calibration source and generation of a digital record related to the calibration of the calibration system.

FIG. 2 is a diagram illustrating calibration of CS 102 using a calibration source 202 and generation of a digital record (e.g., a digital certificate 204 or a related hash value) related to the calibration of CS 102. In some embodiments, calibration source 202 may represent a National Metrology Institute (NMI), e.g., the National Physical Library (NPL) of the United Kingdom or the National Institute of Standards and Technology (NIST) of the United States.

Referring to FIG. 2, CS 102 may execute one or more predefined test routines for calibrating CS 102. For example, CS 102 may execute a calibration test routine involving calibration source 202. In this example, in response to the calibration test routine (e.g., during and/or after completing the calibration test routine), CS 102 may adjust or modify one or more calibration parameter values (e.g., device settings) within CS 102. Continuing with this example, post-calibration parameter values may be usable for calibrating CS 102 such that CS 102 complies with one or more standards associated with the calibration test routine.

In some embodiments, after performing calibration or a portion thereof, CS 102 or another entity may generate a digital certificate 204 indicating various details about the performed calibration or the portion thereof. In some embodiments, digital certificate 204 may represent any digital record containing details (e.g., administrative data, calibration settings, calibration site, etc.) about a performed calibration or portion thereof. In some embodiments, digital certificate 204 and/or a hash value therein may be generated using one or more hash functions and one or more inputs. For example, to generate digital certificate 204 and/or a hash value therein, a hash function may use one or more criteria as input.

In some embodiments, input criteria for a hash function (e.g., a SHA-1, SHA-2, or SHA-3 function) that generates digital certificate 204 and/or a related hash value may include post-calibration parameter values, calibration source identification information, calibration system identification information, calibration routine information, and/or timestamp information. For example, using various data as input, CS 102 may use a SHA-256 function to produce 256-bit hash value that is associated with the calibration of CS 102 (e.g., completion of one or more predefined calibration test routines involving CS 102). In another example, using various data as input, CS 102 may use a SHA-512 function to produce 512-bit hash value that is associated with the calibration of CS 102 (e.g., completion of one or more predefined calibration test routines involving CS 102).

It will be appreciated that FIG. 2 is for illustrative purposes and that various depicted entities, their locations, and/or their functions described above in relation to FIG. 2 may be changed, altered, added, or removed.

Figure 3:
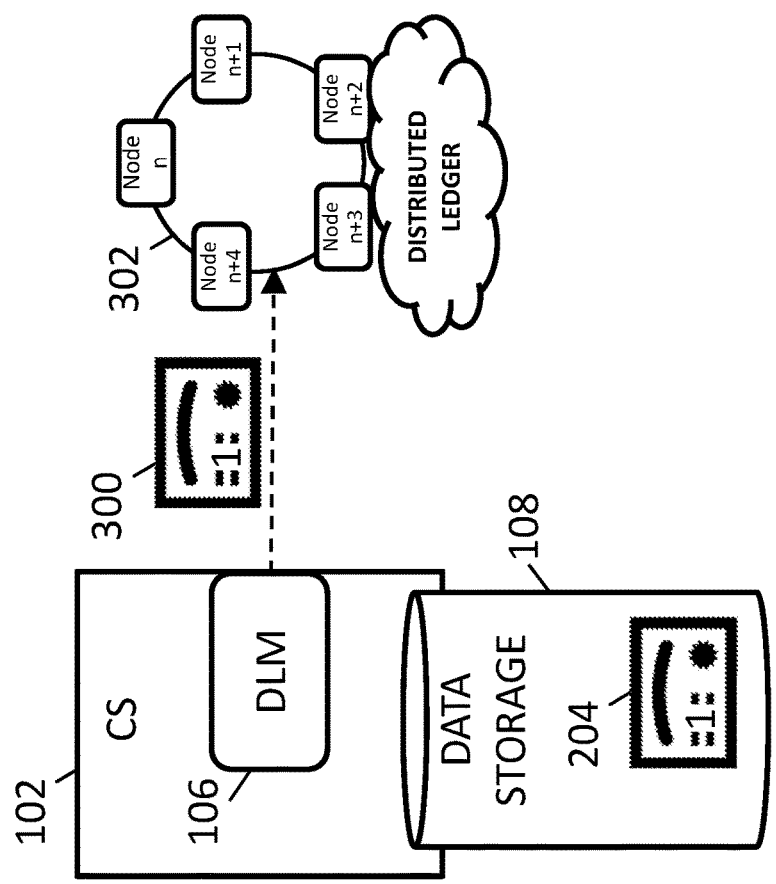
FIG. 3 is a diagram illustrating storing a digital record related to the calibration of the calibration system in a distributed ledger.

FIG. 3 is a diagram illustrating storing a digital record (e.g., digital certificate 300 or a related hash value) related to the calibration of the DUT in distributed ledger 302. Referring to FIG. 3, after CS 102 generates digital certificate 204, CS 102 or DLM 106 may store or facilitate storing digital certificate 300 (e.g., a copy of digital certificate 204 or an encrypted version thereof) in distributed ledger 302. In some embodiments, digital certificate 204, a version thereof (e.g., digital certificate 300), and/or other information may be stored in storage local to CS 102, e.g., data storage 108 and/or may be stored in external storage accessible to CS 102 or DLM 106. For example, secure external storage is accomplished via a distributed ledger or blockchain. In this example, DLM 106 may be configured to provide blockchain client functionality such that DLM 106 can post digital certificate 600 as a blockchain transaction to distributed ledger 302. In some embodiments, DLM 106 or other related entities may perform various actions to facilitate adding the blockchain transaction to the blockchain.

It will be appreciated that FIG. 3 is for illustrative purposes and that various depicted entities, their locations, and/or their functions described above in relation to FIG. 3 may be changed, altered, added, or removed.

Figure 4:
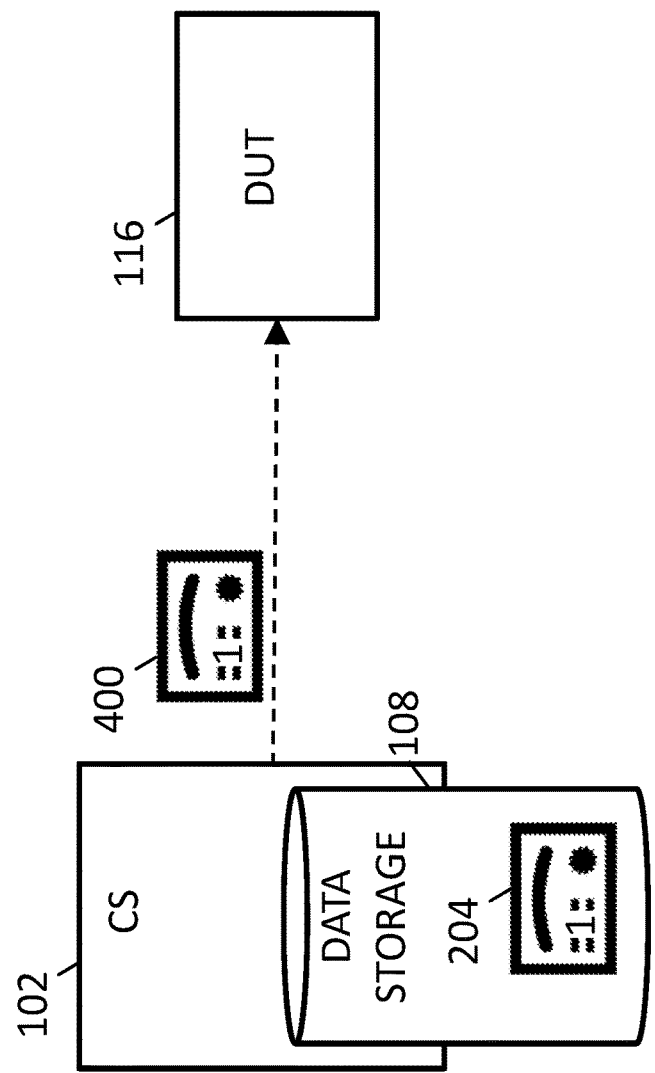
FIG. 4 is a diagram illustrating sending a copy of the digital record related to the calibration of the calibration system from the calibration system to a device under test (DUT)

FIG. 4 is a diagram illustrating sending a copy of the digital record related to the calibration of CS 102 from CS 102 to DUT 116. Referring to FIG. 4, prior to or concurrently with calibration of DUT 116, CS 102 may send a digital certificate 400 (e.g., a copy of digital certificate 204 or an encrypted version thereof) to DUT 116. For example, prior to CS 102 completing a calibration test involving DUT 116 (e.g., an electronic sensor in an autonomous vehicle), a copy of the digital certificate hash value is communicated to DUT 116.

In some embodiments, DUT 116 may store digital certificate 400 and, when calibration of DUT 116 is completed, DUT 116 may generate, using digital certificate 400 and other data, a digital certificate related to the calibration of DUT 116

It will be appreciated that FIG. 4 is for illustrative purposes and that various depicted entities, their locations, and/or their functions described above in relation to FIG. 4 may be changed, altered, added, or removed.

Figure 5:
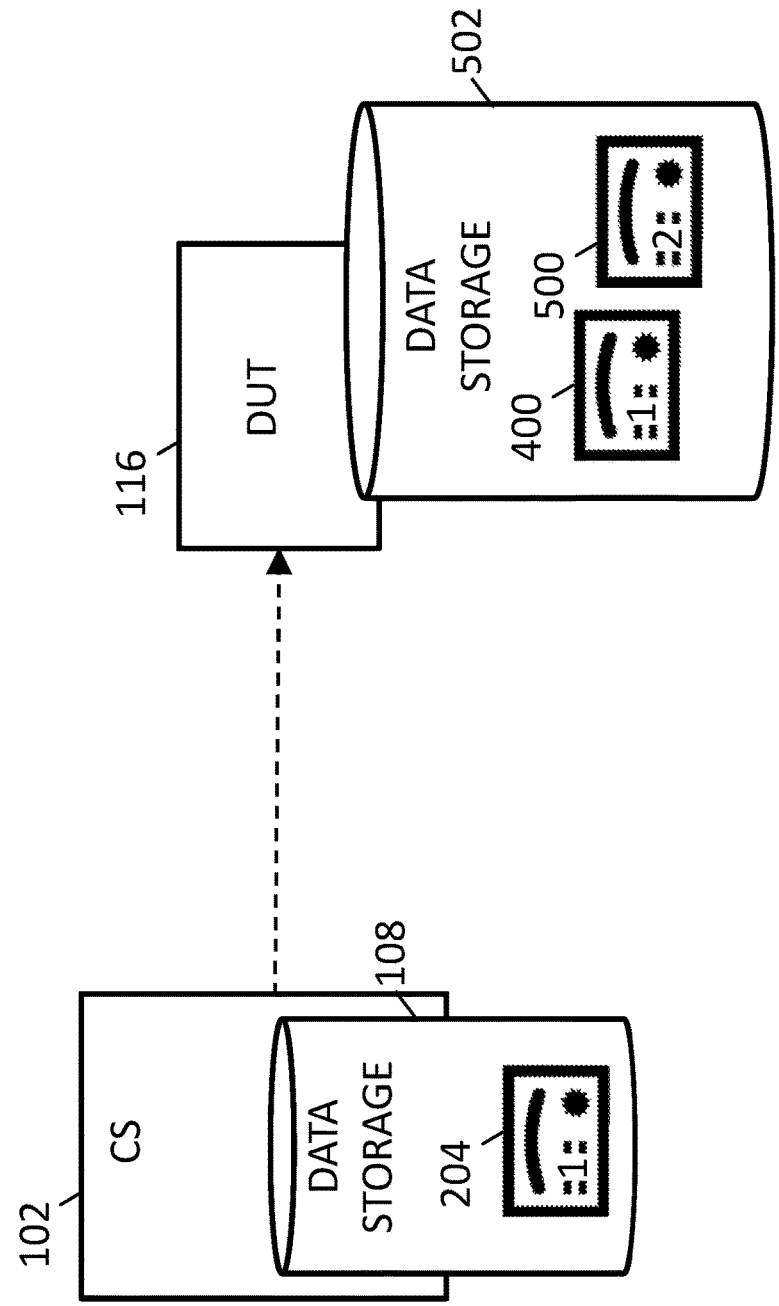
FIG. 5 is a diagram illustrating calibration of the DUT and generation of a digital record related to the calibration of the DUT.

FIG. 5 is a diagram illustrating calibration of DUT 116 and generation of a digital record (e.g., a digital certificate 500 or a related hash value) related to the calibration of DUT 116. Referring to FIG. 5, DUT 116 may execute one or more predefined calibration test routines. For example, CS 102 may facilitate a calibration test routine involving DUT 116 by sending test signals or responding to DUT 116 during the execution of the calibration test routine. In this example, in response to the calibration test routine (e.g., during and/or after completing the calibration test routine), DUT 116 may adjust or modify one or more calibration parameter values (e.g., device settings) within DUT 116. Continuing with this example, post-calibration parameter values may be usable for calibrating DUT 116 such that DUT 116 complies with one or more standards associated with the calibration test routine.

In some embodiments, after performing calibration or a portion thereof, DUT 116 or another entity may generate a digital certificate 500 indicating various details about the performed calibration or the portion thereof. In some embodiments, digital certificate 500 may represent any digital record containing details about a performed calibration or portion thereof. In some embodiments, digital certificate 500 and/or a hash value therein may be generated using one or more hash functions and one or more inputs. For example, to generate digital certificate 500 and/or a hash value therein, a hash function may use one or more criteria as input.

In some embodiments, input criteria for a hash function (e.g., a SHA-1, SHA-2, or SHA-3 function) that generates digital certificate 500 and/or a related hash value may include digital certificate 400 or related data from CS 102, post-calibration parameter values, calibration source identification information, calibration system identification information, calibration routine information, and/or timestamp information. For example, using digital certificate 400 and various other data as input, DUT 116 may use a SHA-256 function to produce 256-bit hash value that is associated with the calibration of DUT 116 (e.g., completion of one or more predefined calibration test routines involving DUT 116).

It will be appreciated that FIG. 5 is for illustrative purposes and that various depicted entities, their locations, and/or their functions described above in relation to FIG. 5 may be changed, altered, added, or removed.

Figure 6:
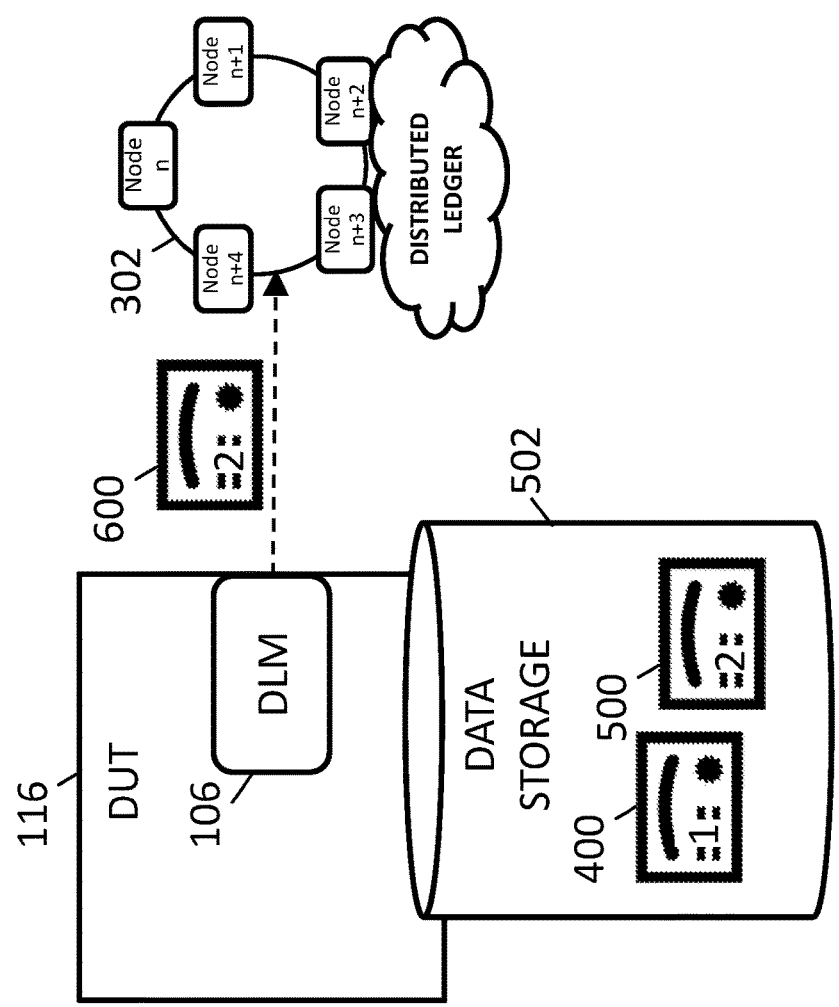
FIG. 6 is a diagram illustrating storing a digital record related to the calibration of the DUT in the distributed ledger.

FIG. 6 is a diagram illustrating storing a digital record (e.g., digital certificate 600 or a related hash value) related to the calibration of the DUT in distributed ledger 302. Referring to FIG. 6, after DUT 116 generates digital certificate 500, DUT 116 or DLM 106 may store or facilitate storing digital certificate 600 (e.g., a copy of digital certificate 500 or an encrypted version thereof) in distributed ledger 302. In some embodiments, digital certificate 500, a version thereof (e.g., digital certificate 600), and/or other information may be stored in storage local to DUT 116, e.g., data storage 502 and/or may be stored in external storage accessible to DUT 116 or DLM 106. For example, secure external storage is accomplished via a distributed ledger or blockchain. In this example, DLM 106 may be configured to provide blockchain client functionality such that DLM 106 can post digital certificate 600 as a blockchain transaction to distributed ledger 302. In some embodiments, DLM 106 or other related entities may perform various actions to facilitate adding the blockchain transaction to the blockchain.

It will be appreciated that FIG. 6 is for illustrative purposes and that various depicted entities, their locations, and/or their functions described above in relation to FIG. 6 may be changed, altered, added, or removed.

Figure 7:
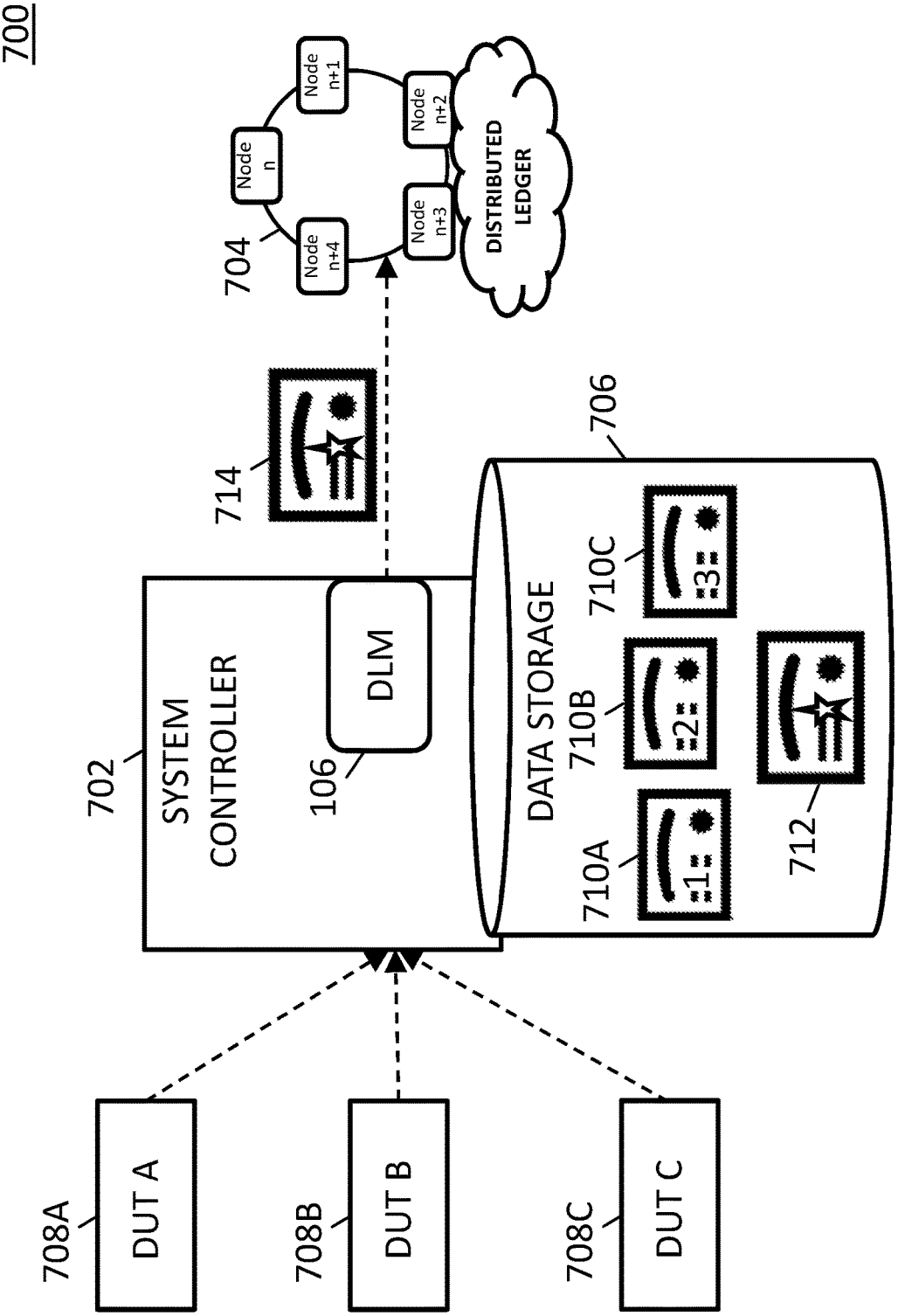
FIG. 7 is a diagram illustrating an example system environment for generating a system-level hash value.

FIG. 7 is a diagram illustrating an example system environment 700 for generating a system-level hash value. System environment 700 may represent various networks or related devices or systems, e.g., an IoT device or network, an autonomous vehicle or system therein (e.g., a sensor system), or another network or system. Referring to FIG. 7, system environment 700 may include a system controller 702, a distributed ledger 704, and a plurality of DUTs 708A-C representing one or more device, components, or equipment in system environment 700.

System controller 702 may represent any suitable entity or entities (e.g., one or more computing platforms, nodes, or devices) associated with generating a system-level hash value or a related digital certificate 714. In some embodiments, system controller 702 may include or utilize one or more modules, processors, communications interfaces, and/or memory, e.g., data storage 706.

In some embodiments, system controller 702 may receive information and/or digital certificates 710A-C from various components or nodes within system environment 700 and using that information may determine or generate information about the state of system environment 700. For example, system controller 702 may include one or more communications interfaces for receiving digital certificates 710A-C or other information from DUTs 708A-C.

In some embodiments, system controller 702 or a related entity may generate a system-level hash value and/or certificate 712. In such embodiments, the system-level hash value and/or certificate 712 may be based on a combination of some or all of digital certificates 710A-C received from DUTs 708A-C. For example, system controller 702 or a related entity generate certificate 712 using a hash function (e.g., a SHA-1, SHA-2, or SHA-3 function) that uses hash values or information from digital certificates 710A-C as input.

In some embodiments, system controller 702 may include data storage 706 for storing digital certificates 710A-C, digital certificate 712, and/or other information. For example, after receiving digital certificates 710A-C, system controller 702 may store these digital certificates 710A-C and/or related information in data storage 706. In this example, after using digital certificates 710A-C to generate digital certificate 714, system controller 702 may store digital certificate 712 in data storage 706.

In some embodiments, system controller 702 may include a DLM 106 for interacting with a distributed ledger 704, e.g., accessing data, storing data, or deleting data therein. For example, after generating a digital certificate 712, DLM 106 may generate a transaction for adding digital certificate 714 (e.g., a copy of digital certificate 714 or an encrypted version thereof) to distributed ledger 704.

In some embodiments, system controller 702 may be a sensor controller, e.g., associated with an autonomous vehicle, industrial equipment, an IoT system, or other device. In such embodiments, each of DUTs 708A-C may be a sensor (e.g., an autonomous vehicle sensor, an avionics sensor, an internet of thing (IoT) sensor, etc.) associated with system environment 700.

It will be appreciated that FIG. 7 is for illustrative purposes and that various depicted entities, their locations, and/or their functions described above in relation to FIG. 7 may be changed, altered, added, or removed.

Figure 8:
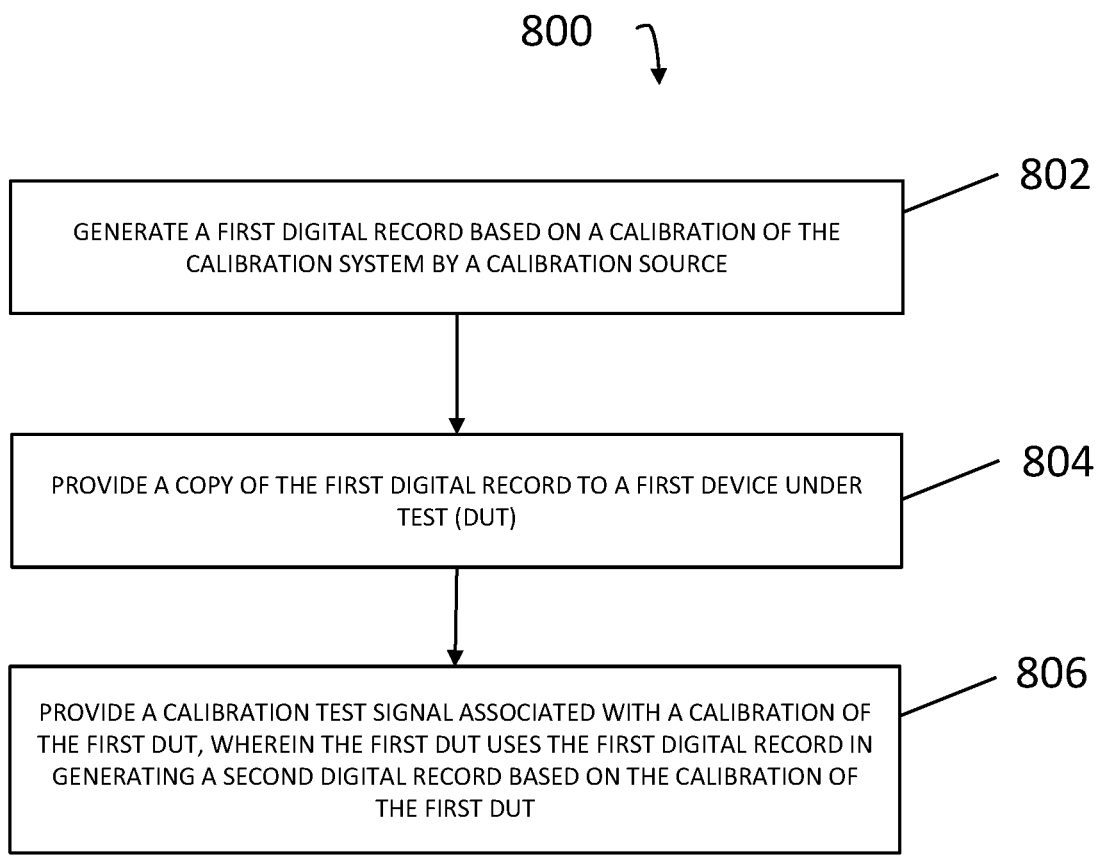
FIG. 8 is a diagram illustrating an example process for calibration testing and traceability using a distributed ledger.

FIG. 8 is a diagram illustrating an example process 800 for calibration testing and traceability using a distributed ledger. In some embodiments, process 800, or portions thereof, may be performed by or at CS 102, DLM 106, system controller 702, and/or another node or module. In some embodiments, process 800 may include steps 802, 804, 806, and/or 806.

Referring to process 800, in step 802, a first digital record may be generated based on a calibration of the calibration system using a calibration source. For example, after calibrating CS 102 using a reference signal from calibration source 202, CS 102 or a related entity may generate digital certificate 204 and store digital certificate 204 in data storage 108.

In step 802, a copy of the first digital record may be provided to a first DUT. For example, CS 102 or a related entity may send digital certificate 400 (e.g., a copy of digital certificate 204) to DUT 116.

In step 804, a calibration test signal associated with a calibration of the first DUT may be provided to the first DUT. In some embodiments, the first DUT uses the first digital record in generating a second digital record based on the calibration of the first DUT. For example, CS 102 may send a calibration test signal when DUT 116 is executing a calibration test routine for calibrating DUT 116. In this example, after calibrating DUT 116 using calibration test routine, DUT 116 or a related entity may generate digital certificate 500, where digital certificate 500 is generated using digital certificate 400 or information therein.

In some embodiments, the first digital record may include a first hash value, wherein the first hash value may be generated using a first hash function (e.g., a SHA-256 function) that uses first calibration parameter values as input, wherein the first calibration parameter values may be based on the calibration of the calibration system.

In some embodiments, the first hash function uses calibration source identification information, calibration system identification information, calibration routine information, and/or timestamp information as input.

In some embodiments, the second digital record may include a second hash value, wherein the second hash value may be generated using a second hash function (e.g., a SHA-256 function) that uses second calibration parameter values and the first digital record as input, wherein the second calibration parameter values may be determined based on the calibration of the first DUT.

In some embodiments, the first digital record may be stored in a distributed ledger, e.g., a blockchain.

In some embodiments, the second digital record may be stored in a distributed ledger by the first DUT, the calibration system, or another entity.

In some embodiments, the first DUT may include a sensor, an autonomous vehicle sensor, an avionics sensor, a network device, an internet of thing (IoT) device, or software.

In some embodiments, a calibration system or a system controller may be configured for receiving a plurality of digital records associated with calibrations of a plurality of DUTs in a related system (e.g., an autonomous vehicle, a computer network, or an IoT network), wherein the second digital record may be one of the plurality of digital records and wherein the first DUT may be one of the plurality of DUTs in the related system; generating, using the plurality of digital records, a system-level hash value that may be indicative of a calibration state of the related system; and storing the system-level hash value or a related digital record in a distributed ledger.

In some embodiments, a system-level hash value or a related digital record may be generated using a hash function that generates a same or larger number of bits than individual DUTs. For example, a system-level hash value may be a 512-bit hash value and a DUT hash value may be a 256-bit hash value.

It will be appreciated that process 800 is for illustrative purposes and that different and/or additional actions may be used. It will also be appreciated that various actions described herein may occur in a different order or sequence.

It should be noted that CS 102, DLM 106, system controller 702, and/or functionality described herein may constitute a special purpose computing device. Further, CS 102, DLM 106, system controller 702, and/or functionality described herein can improve the technological fields of secure data storage, calibration testing, calibration traceability, and/or calibration auditing. For example, by using one or more distributed ledgers (e.g., one or more blockchains) and using hash-based digital certificates, calibration information may be stored in a secured and verifiable accurate format.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for calibration testing and traceability using a distributed ledger, the method comprising:
   at a calibration system implemented using at least one processor:
   generating a first digital record based on a calibration of the calibration system using a calibration source;
   providing a copy of the first digital record to a first device under test (DUT); and
   providing a calibration test signal associated with a calibration of the first DUT, wherein the first DUT uses the first digital record in generating a second digital record based on the calibration of the first DUT, wherein the second digital record includes a second hash value, the second hash value is generated using a second hash function that uses second calibration parameter values and the copy of the first digital record as input, the second calibration parameter values are determined based on the calibration of the first DUT, and the second digital record is stored in a distributed ledger.

2. The method of claim 1 wherein the first digital record includes a first hash value, wherein the first hash value is generated using a first hash function that uses first calibration parameter values as input, wherein the first calibration parameter values are based on the calibration of the calibration system.

3. The method of claim 2 wherein the first hash function uses calibration source identification information, calibration system identification information, calibration routine information, or timestamp information as input.

4. The method of claim 1 comprising:
   storing the first digital record in the distributed ledger.

5. The method of claim 1 wherein the second digital record is stored in the distributed ledger by the first DUT, the calibration system, or another entity.

6. The method of claim 1 wherein the first DUT includes a sensor, an autonomous vehicle sensor, an avionics sensor, a network device, an internet of thing (IoT) device, or software.

7. The method of claim 1 comprising:
at the calibration system or a system controller:
receiving a plurality of digital records associated with calibrations of a plurality of DUTs in a related system, wherein the second digital record is one of the plurality of digital records and wherein the first DUT is one of the plurality of DUTs in the related system;
generating, using the plurality of digital records, a system-level hash value that is indicative of a calibration state of the related system; and
storing the system-level hash value or a related digital record in the distributed ledger.

8. The method of claim 7 wherein the related system includes an autonomous vehicle, a computer network, or an internet of thing (IoT) network.

9. A system for calibration testing and traceability using a distributed ledger, the system comprising:
at least one processor; and
a calibration system implemented using the at least one processor, wherein the calibration system is configured for:
generating a first digital record based on a calibration of the calibration system using a calibration source;
providing a copy of the first digital record to a first device under test (DUT); and
providing a calibration test signal associated with a calibration of the first DUT, wherein the first DUT uses the first digital record in generating a second digital record based on the calibration of the first DUT, wherein the second digital record includes a second hash value, the second hash value is generated using a second hash function that uses second calibration parameter values and the copy of the first digital record as input, the second calibration parameter values are determined based on the calibration of the first DUT, and the second digital record is stored in a distributed ledger.

10. The system of claim 9 wherein the calibration system is configured to generate a first hash value using a first hash function that uses first calibration parameter values as input, wherein the first calibration parameter values are based on the calibration of the calibration system, wherein the first digital record includes the first hash value.

11. The system of claim 10 wherein the first hash function uses calibration source identification information, calibration system identification information, calibration routine information, or timestamp information as input.

12. The system of claim 9 wherein the calibration system is configured for storing the first digital record in the distributed ledger.

13. The system of claim 12 wherein the distributed ledger is a blockchain.

14. The system of claim 9 wherein the second digital record is stored in the distributed ledger by the first DUT, the calibration system, or another entity.

15. The system of claim 9 wherein the first DUT includes a sensor, an autonomous vehicle sensor, an avionics sensor, a network device, an internet of thing (IoT) device, or software.

16. The system of claim 9 wherein the calibration system or a system controller is configured for:
receiving a plurality of digital records associated with calibrations of a plurality of DUTs in a related system, wherein the second digital record is one of the plurality of digital records and wherein the first DUT is one of the plurality of DUTs in the related system;
generating, using the plurality of digital records, a system-level hash value that is indicative of a calibration state of the related system; and
storing the system-level hash value or a related digital record in the distributed ledger.

17. The system of claim 16 wherein the related system includes an autonomous vehicle, a computer network, or an internet of thing (IoT) network.

18. A non-transitory computer readable medium having stored thereon executable instructions embodied in the non-transitory computer readable medium that when executed by at least one processor of a calibration system cause the calibration system to perform steps comprising:
generating a first digital record based on a calibration of the calibration system using a calibration source;
providing a copy of the first digital record to a first device under test (DUT); and
providing a calibration test signal associated with a calibration of the first DUT, wherein the first DUT uses the first digital record in generating a second digital record based on the calibration of the first DUT, wherein the second digital record includes a second hash value, the second hash value is generated using a second hash function that uses second calibration parameter values and the copy of the first digital record as input, the second calibration parameter values are determined based on the calibration of the first DUT, and the second digital record is stored in a distributed ledger.

* * * * *